(12) United States Patent
Harris et al.

(10) Patent No.: US 7,254,658 B2
(45) Date of Patent: Aug. 7, 2007

(54) WRITE TRANSACTION INTERLEAVING

(75) Inventors: Antony John Harris, Sheffield (GB); Bruce James Mathewson, Papworth Everard (GB)

(73) Assignee: ARM Limited, Cambridge (GB)

( * ) Notice: Subject to any disclaimer, the term of this patent is extended or adjusted under 35 U.S.C. 154(b) by 161 days.

(21) Appl. No.: 10/862,872

(22) Filed: Jun. 8, 2004

(65) Prior Publication Data
US 2005/0273535 A1    Dec. 8, 2005

(51) Int. Cl.
*G06F 13/00* (2006.01)
(52) U.S. Cl. .............................. 710/110; 710/21; 710/35
(58) Field of Classification Search .................. 710/21, 710/110–116, 35
See application file for complete search history.

(56) References Cited

U.S. PATENT DOCUMENTS

| | | | | |
|---|---|---|---|---|
| 5,568,620 A | * | 10/1996 | Sarangdhar et al. | 710/105 |
| 5,615,343 A | * | 3/1997 | Sarangdhar et al. | 710/112 |
| 5,621,897 A | * | 4/1997 | Boury et al. | 710/116 |
| 5,793,994 A | * | 8/1998 | Mitchell et al. | 710/105 |
| 6,182,183 B1 | * | 1/2001 | Wingard et al. | 710/305 |
| 2005/0144371 A1 | * | 6/2005 | Walker | 711/105 |

OTHER PUBLICATIONS

Bryg et al. A High-Performance, Low-Cost Multiprocessor Bus for Workstations and Midrange Servers. Hewlett-packard Journal. Feb. 1996.*
The CoreConnect Bus Architecture. International Business Machines Corporation. 1999.*
Suzuki et al. A Multimedia-oriented Embedded RISC Processor with a Rambus DRAM Controller. Solid-State Circuits Conference. Sep. 24, 1998.*

* cited by examiner

*Primary Examiner*—Mark H. Rinehart
*Assistant Examiner*—Matthew Spittle
(74) *Attorney, Agent, or Firm*—Nixon & Vanderhye P.C.

(57) ABSTRACT

A bus master 2, 4 sends write transactions to a bus slave 8 which include separate write addresses AW and write data WD. Write transaction identifiers AWID, WID are associated with these write addresses and write data. The bus slave can accept multiple write addresses such that there can be copending write transactions to the same bus slave. The bus slave uses the write transaction identifiers to correlate interleaved write data for the co-pending write transactions with their write addresses.

14 Claims, 2 Drawing Sheets

WRITE TRANSACTION INTERLEAVING

BACKGROUND OF THE INVENTION

1. Field of the Invention

This invention relates to the field of data processing systems. More particularly, this invention relates to data processing systems in which write transactions to a bus slave are interleaved such that write data of a plurality of co-pending write transactions is received in a variable order by the bus slave.

2. Description of the Prior Art

It is known to provide data processing systems including one or more bus masters connected by a communication bus (possibly a multi-channel bus) to one or more bus slaves. A write transaction is initiated by a bus master to a bus slave and includes separately transferring a write address from the bus master to the bus slave and the write data from the bus master to the bus slave.

In order to improve data throughput and processing capacity, high performance bus protocols can allow burst based addressing, (i.e., a single address is permitted per burst; address and data are de-coupled; a master is permitted to transmit a number of write addresses before transferring the data. When using such a protocol, a slave can accept a number of co-pending write addresses, but must accept all the write data in the same order as the addresses were issued in order that the write data can be correlated with the write addresses.

SUMMARY OF THE INVENTION

Viewed from one aspect the present invention provides apparatus for processing data, said apparatus comprising:

at least one bus master operable to generate write transactions; and at least one bus slave operable to receive said write transactions; wherein a write transaction includes transferring a write address from a bus master to a bus slave and separately transferring write data from said bus master to said bus slave;

said bus slave is operable to receive a plurality of interleaved write transactions whereby write data of a plurality of co-pending write transactions is received in a variable order with respect to corresponding write addresses;

a bus master interface circuit between said bus master and said bus slave is operable to generate a transaction identifier for a write transaction, said transaction identifier being transferred to said bus slave with said write address and with said write data; and said bus slave is responsive to respective transaction identifiers associated with interleaved write transactions to correlate received writes addresses and received write data.

The present technique recognizes that when using a bus protocol such as is discussed above and when a bus slave has accepted a number of write addresses, it is possible that the sources of the write data perform at very differing speeds and the strong ordering of the write data (the requirement that the full write data must be transmitted in the same order as the write addresses) can significantly restrict the performance of the system. As an example, a bus interconnect which is combining the write channels of a microprocessor core and a DMA engine may utilize burst-based addressing as discussed above. The core may have all its write data available to transmit as soon as the write address is accepted by the slave whereas a DMA engine may be relying on a slow peripheral to provide read data which it is streaming directly to the write data bus. In this example, if the bus slave accepts a write address from the DMA engine before the write address from the microprocessor core, then the write data from the microprocessor core will be stalled by the bus interconnect until all the write data for the DMA write burst is completed. Having recognized this potential performance bottleneck, the present technique provides the solution of enabling the re-ordering/interleaving of the write data with respect to the write addresses by using a transaction identifier which is associated with a write transaction and may be used by a bus slave to correlate received write data with corresponding write addresses. In addition, this transaction identifier can be added by a bus master interface circuit between the bus master and the bus slave in a manner which significantly simplifies the merging and splitting of write data channels. The order of the write data with respect of the write addresses may be completely variable, or subject to some constraint, e.g. first write data word of each burst in the same order as the addresses. It is possible for write data to be received at a bus slave before a corresponding write address transferred by a separate channel.

It will be appreciated that the bus master interface circuit could be part of a source bus master itself (e.g. a microprocessor core or a DMA engine as discussed above), but in preferred embodiments the bus master interface circuit is part of a bus interconnect circuit coupled to a plurality of bus masters, said bus interconnect circuit being operable to receive write transactions from the plurality of bus masters and to act as a bus master to issue said write transactions to a bus slave on a common communication bus, said bus master interface circuit within said bus interconnect circuit being operable to generate different transaction identifiers for transfer to said bus slave circuit with write addresses and write data originating from different ones of said plurality of bus masters. The bus interface circuit can vary in position between one or more us masters and one or more bus slaves. There may also be multiple bus interface circuits in the bus path.

Providing the bus master interface circuit within the bus interconnect circuit with this capability of adding transaction identifiers significantly enhances the scalability of the bus architecture utilizing such bus interconnect circuits since these may add or remove transaction identifiers as appropriate to combination or splitting of busses or channels.

Whilst it would be appreciated that the present technique is strongly advantageous when used in the context of burst mode write transactions comprising a single write address and multiple words of write data, the technique is also useful in non-burst mode type operations, e.g. in which a write address is transferred per write data word, but the order of receipt of the write addresses and the write data by the bus slave is varied.

Whilst it will be appreciated that in some embodiments is may be possible that the ordering of the write data is completely de-coupled from the ordering of the write addresses, the design and control of the busses is simplified and potential deadlock situations avoided in embodiments in which the bus interface circuit is operable such that first data words of write data of different transactions are transferred to the bus slave in the same order as corresponding write addresses of said different write transactions are transferred to the bus slave.

Whilst the present technique is applicable to a wide variety of different forms of communication bus, it is particularly well suited to embodiments in which the write addresses and the write data are transferred on separate communication channels within the communication bus since this type of arrangement is one in which the addresses and data are generally more readily de-coupled.

The capabilities of the bus slaves to perform the required correlation upon interleaved write data can vary and accordingly in preferred embodiments a predetermined write interleave depth is specified for a bus slave, the bus master interface circuit being operable to restrict a maximum number of co-pending write transactions transferred to the bus slave in dependence upon that predetermined write interleaved depth. Thus, a relatively simple and unsophisticated bus slave will not be overloaded with too many co-pending write transactions whereas a more sophisticated bus slave is able to take more advantage of its ability to overlap a large number of co-pending write transactions.

The implementation of embodiments is simplified when strong ordering is preserved for bus masters having a common transaction identifier.

Viewed from another aspect the present invention provides a method of processing data, said method comprising the steps of:

generating write transactions with at least one bus master; and receiving said write transactions with at least one bus slave; wherein a write transaction includes transferring a write address from a bus master to a bus slave and separately transferring write data from said bus master to said bus slave;

said bus slave is operable to receive a plurality of interleaved write transactions whereby write data of a plurality of co-pending write transactions is received in a variable order, with respect to corresponding write addresses;

a bus master interface circuit between said bus master and said bus slave is operable to generate a transaction identifier for a write transaction, said transaction identifier being transferred to said bus slave with said write address and with said write data; and said bus slave is responsive to respective transaction identifiers associated with interleaved write transactions to correlate received writes addresses and received write data.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
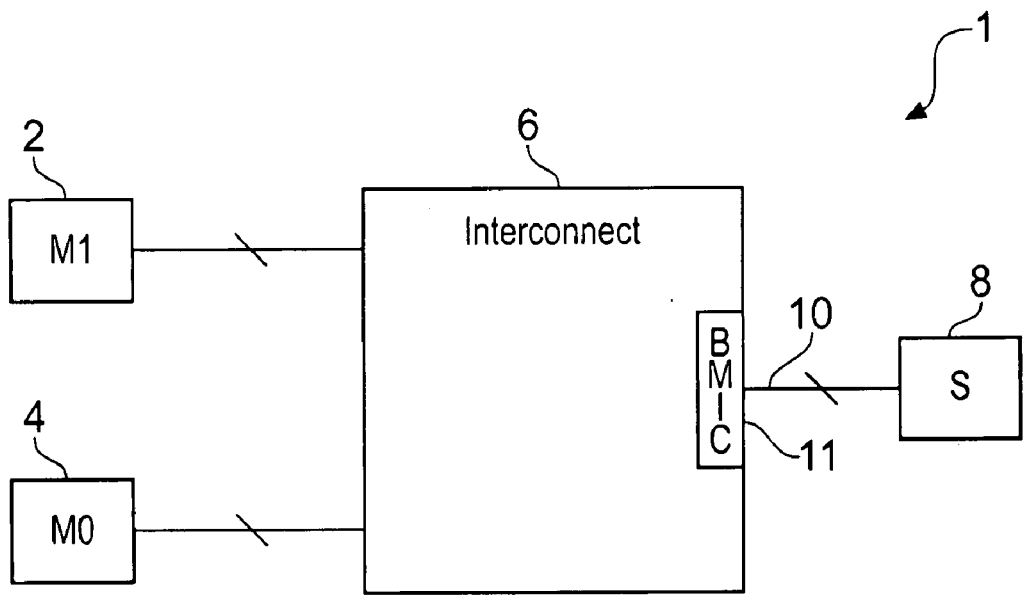
FIG. 1 schematically illustrates a data processing circuit incorporating bus masters, a bus slave and a bus interconnect circuit.

FIG. 1 illustrates a data processing system 2, which may, for example, be an integrated circuit such as a system-on-chip circuit, the data processing system 2 includes bus masters 2, 4, a bus interconnect circuit 6 and a bus slave 8. The bus interconnect circuit 6 serves to couple the two bus masters 2, 4 to the single bus slave 8 using a common communication bus 10. A bus master interface circuit 11 within the bus interconnect circuit 6 serves to receive transactions from the bus masters 2, 4 and issue these acting as a bus master itself to the bus slave 8. The write transactions supported by the bus masters 2, 4, the bus interconnect circuit 6 and the bus slave 8 have a variety of different forms including read transactions, write transactions, burst mode transactions, etc. One form of burst mode transaction is that a single address is issued for the transaction followed by the transfer of multiple data words associated with that single address.

Figure 2:
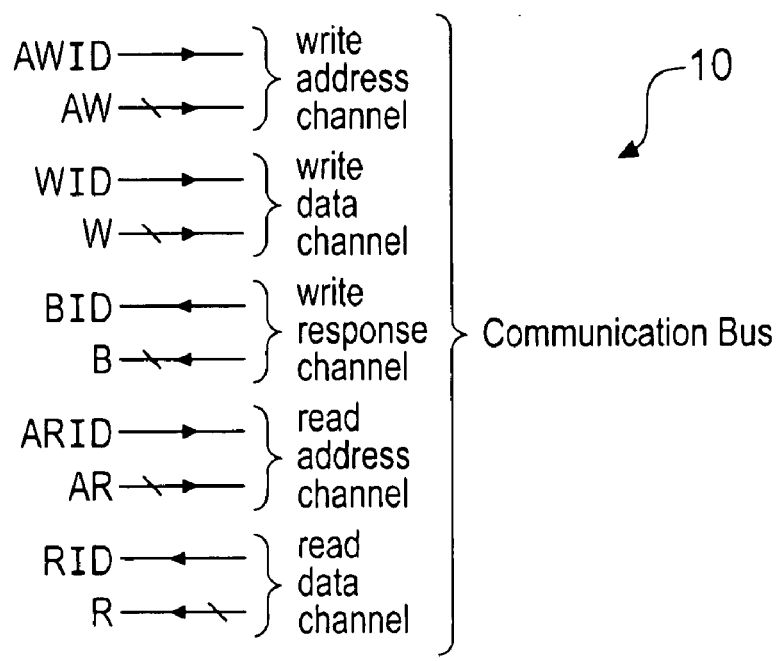
FIG. 2 schematically illustrates a multi-channel communication bus.

FIG. 2 illustrates the communication bus 10 in more detail. In this example the communication bus 10 comprises five communication channels. These are a write address channel, a write data channel, a write response channel, a read address channel and a read data channel. Each of these channels has respective signal lines for transferring an associated transaction identifier AWID, WID, BID, ARID, RID in association with the payload data transferred on the main portion of that channel. These transaction identifiers are used by the bus masters, the bus slaves and the bus interconnect circuits to correlate together different transfers of information, whether that be address information, data information, write response information or the like, which occur on the respective communication channels with differing timings and in differing sequences/orders.

Figure 3:
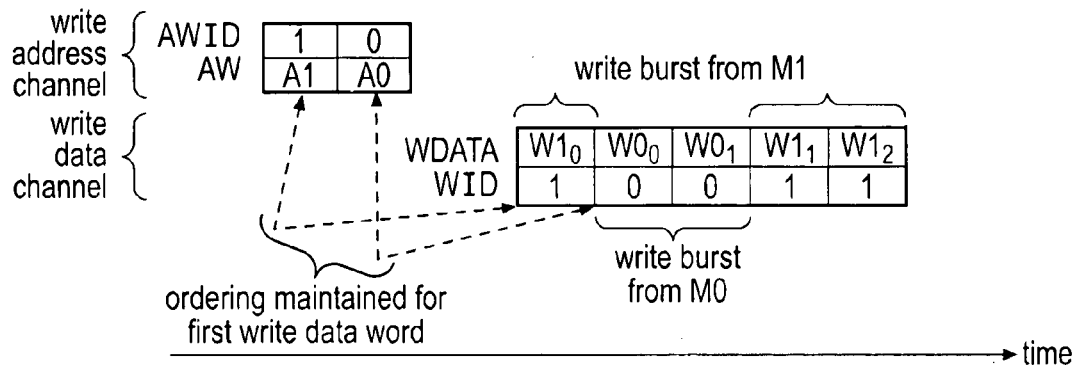
FIG. 3 schematically illustrates interleaved co-pending write transactions.

FIG. 3 schematically illustrates activity upon the write address channel and the write data channel associated with two burst mode write transactions which are co-pending to the same target bus slave and for which the write data is interleaved. Non-burst transactions are also possible. As illustrated, the write address A1 associated with a write transaction issued from the first bus master M1 is first transferred upon the write address channel. This is followed by a write address A0 for a different write transaction originating from the second bus master M0. At a later time, and upon the separate write data channel, the corresponding write data $W1_{0-2}$ and $W0_{0-1}$ is transferred. As illustrated, the write burst for the bus master M0 (which is illustrated as contiguous, but could also be interleaved) is interleaved in the middle of the data forming the write burst for the bus master M1. Associated with each write data word is a write data identifier WID. These write data identifiers are the same for corresponding write transactions as were used with the previously issued write addresses A1, A0 upon the write address channel. Accordingly, the receiving bus slave can correlate together received write data with its corresponding write address by matching the transaction identifiers. Buffering, comparison and routing circuits within the bus slave are used to perform such correlation and de-interleaving of the write data stream.

As illustrated in FIG. 3, the order of issue of the write addresses is A1 followed by A0. This ordering is maintained for at least the first write data word $W1_0$, $W0_0$ of each transaction which is subsequently issued on the write data channel. This helps to simplify the rules regarding write address and data timing and ordering.

Figure 4:
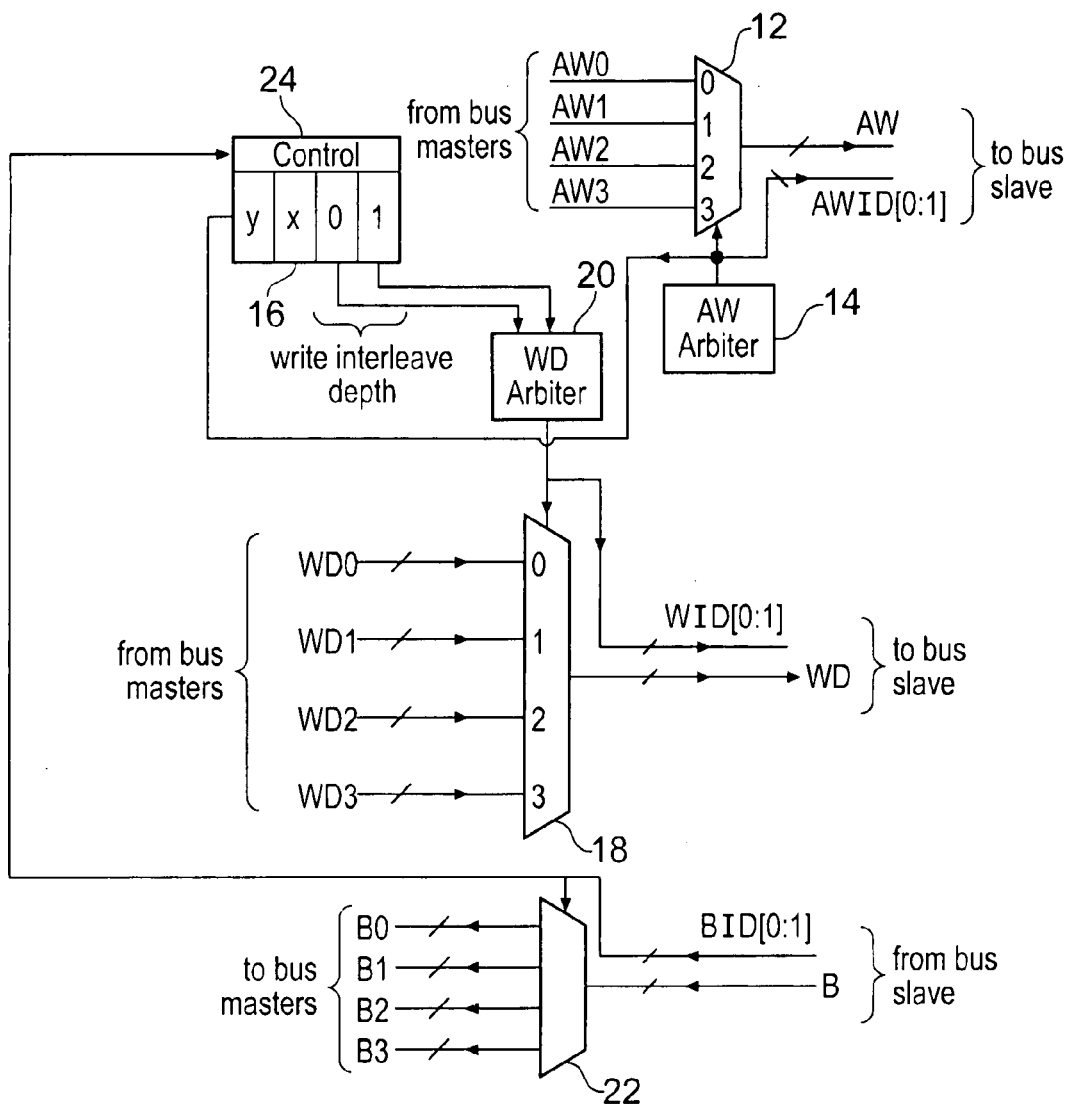
FIG. 4 schematically illustrates a portion of a bus master interface circuit supporting interleaved co-pending write transactions utilizing transaction identifiers.

FIG. 4 schematically illustrates a portion of a bus master interface circuit utilizing the above described transaction identifiers. A write address channel multiplexer 12 serves to select between write addresses issued from respective bus masters under control of a write address arbiter 14. The write address arbiter 14 generates a master select signal which can be used to switch the multiplexer 12 and also serves as the write address transaction identifier. This write address transaction identifier is fed to a memory 16 which serves to control interleaving of the write data. This memory 16 is a form of FIFO memory in which the transaction identifiers are fed in and preserve their relative order whilst transaction identifiers may be emptied from the memory 16 in a random order depending on when those transactions happen to be completed. There are several ways the end of the burst can be detected, e.g. counting a LAST signal or a write response channel signal such as B.

In the write data channel, a multiplexer 18 serves to select between write data supplied from the bus masters under control of a write data arbiter 20. The write data arbiter 20 reads from the memory 16 for which transaction identifiers a write address has already been passed to the bus slave and accordingly from which of the bus masters it can select write data to be interleaved together and passed to the bus slave. The maximum number of co-pending write transactions which can be dealt with by the bus slave constrains a write interleave depth associated with the memory 16 and the write data arbiter 20 in that it controls how many taps from the memory 16 are fed to the write data arbiter 20 and from among how many outstanding transactions it can select a bus master to have its write data routed to the bus slave. The particular transaction with its transaction identifier that is selected by the write data arbiter 20 for a given bus cycle is supplied as a signal to control switching of the multiplexer 18 as well as being used to form the write data transaction identifier WID which is passed to the bus slave. This write data transaction identifier is used by the receiving bus slave to correlate the write data associated with it together with a previously transmitted write address bearing the same transaction identifier which was sent as the AWID signal on the write address channel.

The write response channel returns a write response signal B together with a write response transaction identifier BID from the bus slave which identifies the particular write transaction to which the response data corresponds. This write response transaction identifier is used to control a write response de-multiplexer 22 which routes the write response to the appropriate bus master. The write response transaction identifier BID is also fed to a controller 24 associated with the memory 16 which serves to empty transaction identifiers from the memory 16 when the write response B indicates a particular write transaction has completed. As alternatives, the transaction identifiers can be emptied under control of a write last signal WLAST or using a count down to empty having initial written a length value ALEN into the FIFO.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:
    at least one bus master operable to generate write transactions; and
    at least one bus slave operable to receive said write transactions; wherein
    a write transaction includes transferring a write address from a bus master to a bus slave and separately transferring write data from said bus master to said bus slave;
    said bus slave is operable to receive a plurality of interleaved write transactions whereby the write data of a plurality of co-pending write transactions is received in a variable order, with respect to corresponding write addresses;
    a bus master interface circuit between said bus master and said bus slave is operable to generate a transaction identifier for a write transaction, said transaction identifier being transferred over a first identifier bus channel to said bus slave with said write address and separately over a second identifier bus channel to said bus slave with said write data; and
    said bus slave is responsive to respective transaction identifiers associated with interleaved write transactions to correlate received writes addresses with received write data.

2. Apparatus as claimed in claim 1, wherein said bus master interface circuit is part of a bus interconnect circuit coupled to a plurality of bus masters, said bus interconnect circuit being operable to receive write transactions from said plurality of bus masters and to act as a bus master to issue said write transactions to a bus slave on a common communication bus, said bus master interface circuit within said bus interconnect circuit being operable to generate different transaction identifiers for transfer to said bus slave with write addresses and write data originating from different ones of said plurality of bus masters.

3. Apparatus as claimed in claim 1, wherein said write transactions are one of:
    (i) burst mode write transactions comprising a single write address and multiple words of write data; and
    (ii) non-burst mode write transactions comprising a single write address and a single word of write data.

4. Apparatus as claimed in claim 1, wherein said bus master interface circuit is operable such that first data words of write data of different write transactions are transferred to said bus slave in the same order as corresponding write addresses of said different write transactions are transferred to said bus slave.

5. Apparatus as claimed in claim 1, wherein said write addresses and said write data are transferrable from said bus master to said bus slave on separate communication channels within a communication bus.

6. Apparatus as claimed in claim 1, wherein a predetermined write interleave depth is specified for said bus slave, said bus master interface circuit being operable to restrict a maximum number of co-pending write transactions transferred to said bus slave in dependence upon said predetermined write interleave depth.

7. Apparatus as claimed in claim 1, wherein said bus master interface circuit is operable to transfer to said bus slave, in the same order in which they were generated, write transactions having a common transaction identifier.

8. A method of processing data, said method comprising the steps of:
    generating write transactions with at least one bus master; and
    receiving said write transactions with at least one bus slave; wherein
    a write transaction includes transferring a write address from a bus master to a bus slave and separately transferring write data from said bus master to said bus slave;
    said bus slave receiving a plurality of interleaved write transactions whereby write data of a plurality of co-pending write transactions is received in a variable order with respect to corresponding write addresses;
    a bus master interface circuit between said bus master and said bus slave generating a transaction identifier for a write transaction, said transaction identifier being transferred over a first identifier bus channel to said bus slave with said write address and separately over a second identifier bus channel to said bus slave with said write data; and said bus slave responding to respective transaction identifiers associated with interleaved write transactions to correlate received writes addresses with received write data.

9. A method as claimed in claim 8, wherein said bus master interface circuit is part of a bus interconnect circuit coupled to a plurality of bus masters, said bus interconnect circuit receiving write transactions from said plurality of bus masters and to act as a bus master to issue said write transactions to a bus slave on a common communication bus, said bus master interface circuit within said bus interconnect circuit generating different transaction identifiers for transfer to said bus slave with write addresses and write data originating from different ones of said plurality of bus masters.

10. A method as claimed in claim 8, wherein said write transactions are one of:

(i) burst mode write transactions comprising a single write address and multiple words of write data; and (ii) non-burst mode write transactions comprising a single write address and a single word of write data.

11. A method as claimed in claim 8, wherein said bus master interface circuit transfers first data words of write data of different write transactions to said bus slave in the same order as corresponding write addresses of said different write transactions are transferred to said bus slave.

12. A method as claimed in claim 8, wherein said write addresses and said write data are transferred from said bus master to said bus slave on separate communication channels within a communication bus.

13. A method as claimed in claim 8, wherein a predetermined write interleave depth is specified for said bus slave, said bus master interface circuit restricting a maximum number of co-pending write transactions transferred to said bus slave in dependence upon said predetermined write interleave depth.

14. A method as claimed in claim 8, wherein said bus master interface circuit transfers to said bus slave, in the same order in which they were generated, write transactions having a common transaction identifier.

* * * * *